Oct. 19, 1948.                R. M. ELDER ET AL                 2,451,481
                    BRACING DEVICE FOR BOMBS ON AIRCRAFT
Filed Sept. 4, 1945                                          2 Sheets-Sheet 1

*INVENTOR.*
ROBERT M. ELDER
JOHN J. DOMOJ
BY
Ralph L. Chappell
ATTORNEY

Oct. 19, 1948.  R. M. ELDER ET AL  2,451,481
BRACING DEVICE FOR BOMBS ON AIRCRAFT

Filed Sept. 4, 1945  2 Sheets-Sheet 2

Inventor
ROBERT M. ELDER
JOHN J. DOMOJ

By F. J. Schmitt
Attorney

UNITED STATES PATENT OFFICE 2,451,481

BRACING DEVICE FOR BOMBS ON AIRCRAFT

Robert M. Elder and John J. Domoj, Philadelphia, Pa.

Application September 4, 1945, Serial No. 614,330

4 Claims. (Cl. 89—1.5)

(Granted under the act of March 3, 1883, as amended April 30, 1928; 370 O. G. 757)

This invention relates to new and useful improvements in bracing structures and more particularly to structures for bracing, bombs, torpedoes, auxiliary fuel tanks and the like that are carried in suspended relation beneath an airplane.

It is common practice, particularly in the naval air service, for planes to carry bombs, torpedoes, auxiliary fuel tanks and like objects in a suspended position beneath the fuselage or wings of the plane, the objects being secured to a suitable support device or rack from which they may be released to be dropped or jettisoned as desired. In the case of naval aircraft, which are catapulted into the air, and in the case of carrier-based aircraft landed by the use of arresting gear, it has been found highly desirable to brace such suspended objects to prevent them from swaying under the influence of the large concentrated acceleration forces of catapult take-offs and the deceleration forces of arrested landings.

With the foregoing in mind, the principal object of the present invention is to provide novel means for bracing objects carried beneath a plane against sway as the result of concentrated acceleration and deceleration forces imparted to the plane.

Another object of the present invention is to provide novel bracing means of the type described which may be retained after release or jettisoning of the carried object or which may be released or jettisoned therewith as desired.

A further object of the present invention is to provide a novel bracing means having the features and characteristics set forth which is of relatively simplified and rugged construction, may be easily and quickly installed and applied, and which is highly effective and fool-proof in operation and use.

These and other objects of the invention and the various features and details of the construction, installation and operation thereof, are hereinafter fully set forth and described with reference to the accompanying drawing, in which:

Fig. 1 is a view in perspective showing bracing means embodying the present invention operatively associated with a support or rack for a bomb, torpedo, fuel tank or the like.

Figure 2:
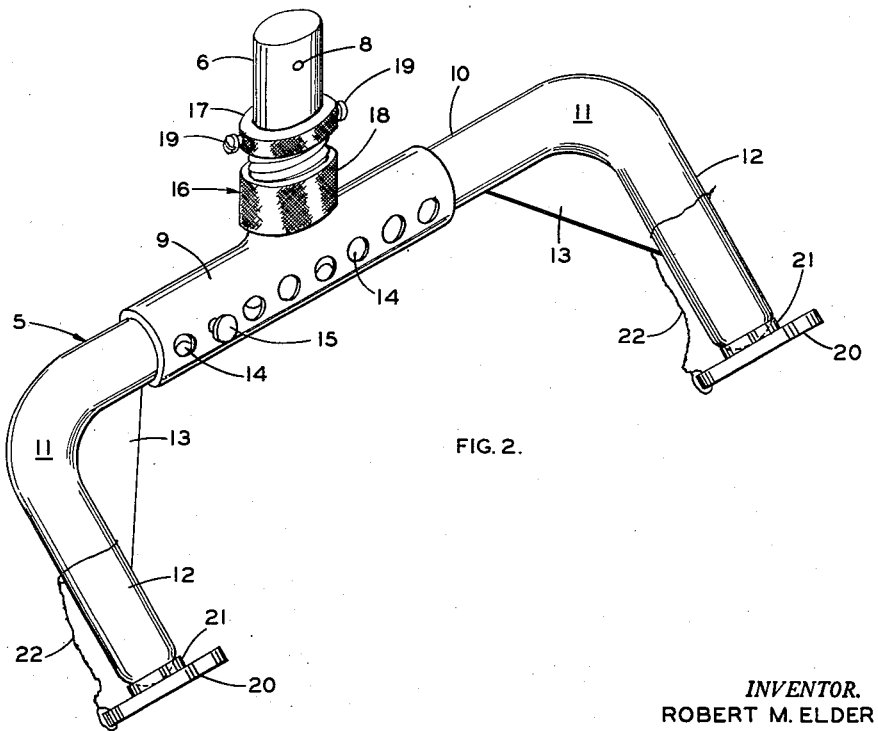
Fig. 2 is an enlarged view in perspective of the novel brace means of the invention.
Figure 3:
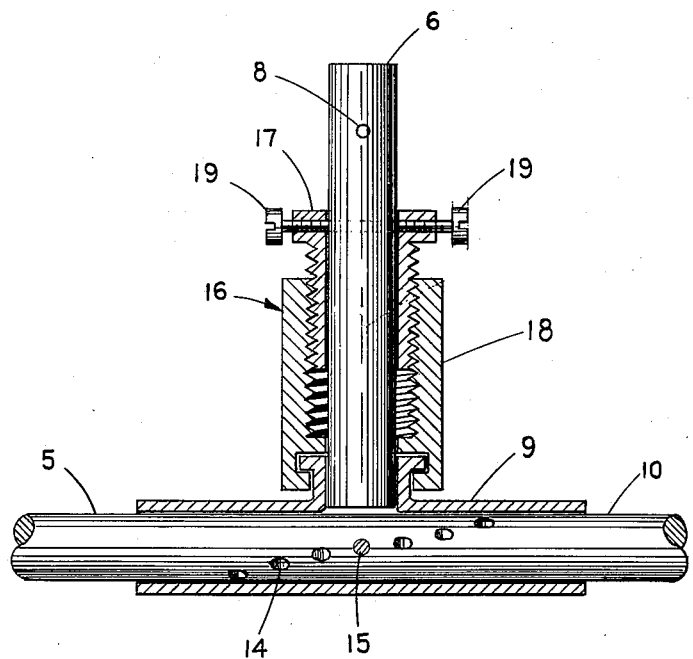
Figure 3 is a fragmentary view of Figure 2, sectionalized through the coupling and the sleeve.

Referring now more particularly to the drawing, the present invention is shown in Fig. 2 in conjunction with a conventional type bomb rack 1 which is secured in fore and aft direction, for example, beneath the wing 2 of a plane. The bomb rack 1 has depending outwardly therefrom a hook or the like 3 from which a bomb or similar object 4 is suspended in the usual manner, the said hook 3 being actuable, either manually or otherwise, to release the object 4 as required or desired.

To prevent the suspended object 4 from swaying, particularly when subjected to the large acceleration and deceleration forces of catapult take-offs and arrested landings, respectively, of the carrying plane, there are provided adjacent the fore and aft end of the support 1, braces 5 made according to the present invention.

Figure 1:
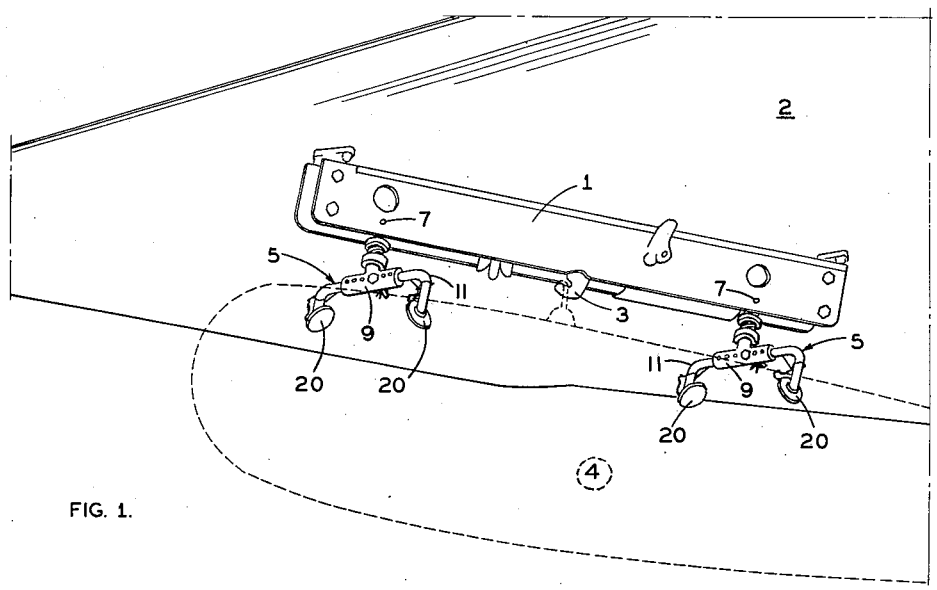

A brace 5 made according to this invention comprises a stud or shaft portion 6 which is constructed and arranged to be slidably inserted upwardly into the support 1 and supported therein with its axis substantially perpendicular to the long axis of the support 1, as and in the relation shown in Fig. 1 of the drawing. The studs 6 of the brace 5 may be secured in the support 1 by means of suitable set screws or the like 7 (see Fig. 1) arranged to engage holes 8 provided in said studs, or may be loosely inserted in said support, depending upon whether it is desired to retain the braces 5 after the object 4 is released from the hook 3, or whether it is desired to jettison the braces 5 simultaneously with release of the object 4.

Referring now to Fig. 2 of the drawing, the stud 6 has secured to the lower end thereof a tubular or sleeve portion 9 which has its axis disposed normal to the axis of the stud 6, and is arranged with respect to the stud 6 so that the ends of the sleeve 9 extend substantially equal distances laterally outward from opposite sides of said stud as shown.

Mounted within the sleeve 9 is the base or horizontal portion 10 of an inverted generally U-shaped member 11 which has its parallel leg portions 12 disposed in substantially spaced apart relation as indicated, the said base 10 and legs 12 being suitably reinforced and braced with respect to one another, for example, by means of corner webs or the like 13. The U-shaped member 11 has its portion 10 rotatably disposed within the sleeve 9 so that the said member 11 may be positioned in different angular relationships with respect to the stud 6. To this end, there are provided through the sleeve 9 and through the base portion 10 of the U-shaped member 11, a plurality of openings 14 arranged so that in any angular position of the member 11 one of the openings through the sleeve 9 will register with at least one of the openings in the member portion 10 so that a pin 15 may be inserted therethrough to secure or lock the member 11 in the particular angular position with respect to the stud 6 that may be required or desired. The pin 15 may be retained against displacement by means of a cotter-pin or the like (not shown).

As shown in Fig. 1 of the drawing, the stud 6 of the brace 5 is positioned in the support 1 so that the member 11 is disposed in transverse or straddling relation with respect to the object 4 suspended from said support 1, and so that the legs 12 of said member 11 extend downwardly in position for their free ends to engage the object 4 laterally at opposite sides of the center line thereof.

With the braces 5 positioned in the support 1 and an object 4 suspended upon the hook 3, it is essential that the legs 12 of the members 11 of each brace be urged downwardly into contact with the surface of the object 4 with sufficient force in order to effectively brace the object 4 against sway when the carrying plane is subjected to abnormal acceleration or deceleration forces. Accordingly there is mounted upon the stud 6 of each brace a tubular coupling arrangement 16 comprising members 17 and 18 threaded together so that upon rotation of one of said members 17 or 18 with respect to the other a relative expansion or contraction of the coupling 16 takes place depending upon the direction of rotation of the said members relative to one another.

Thus, with the object 4 and braces 5 positioned and arranged as hereinbefore described, a relative rotation of the members 17 and 18 in the appropriate direction to effect an expansion or elongation of the couplings 16, will react between the underside of the support 1 and the brace sleeves 9 to urge the latter and the members 11 carried thereby in a downward direction so that the free ends of the legs 12 are urged into contact with the surface of the suspended object 4, the force with which said legs 12 engage the object 4 depending upon the extent or amount of expansion or elongation of the coupling 16 through relative rotation of its members 17 and 18 with respect to one another. The coupling members may be secured or locked in the position to which adjusted by means of set screws or the like 19.

In order that distortable objects such as, for example, fuel tanks, will not be dented or damaged by the ends of the brace legs 12 urged into contact therewith, suitable disc elements 20 are provided for interposition between the leg ends and the surface of the suspended object 4 as shown. These disc elements 20 may be provided with shallow sockets 21 to receive the rounded ends of the brace legs 12, and to prevent loss or mislaying of the discs 20 they may be permanently connected to the braces 5, for example, by means of flexible wires, cables or the like 22.

From the foregoing description it will be apparent that the present invention provides a novel means for bracing objects carried in suspended relation beneath a plane against sway as the result of concentrated acceleration and deceleration forces imparted to the plane. The invention also provides a novel bracing means of the described type which may be retained after release or jettisoning of the object carried or which may be released or jettisoned simultaneously with the object as desired. Furthermore, the invention provides a novel bracing means having the features and characteristics set forth which is of relatively simplified and rugged construction, easily and quickly installed and applied, and which is highly effective and fool-proof in operation and use.

While a particular embodiment of the present invention has been illustrated and described herein, it is not intended that the invention be limited to such disclosure, and changes and modifications may be made thereto within the scope of the claims.

The invention described herein may be manufactured and used by or for the Government of the United States of America for governmental purposes without the payment of any royalties thereon or therefor.

We claim:

1. A device for use in conjunction with a suspension support to brace objects suspended therefrom against sway, comprising a structure including a mounting member arranged to be inserted in said support, a brace member carried by said mounting member and having depending spaced parallel leg portions arranged to engage the surface of said suspended object laterally at opposite sides of the center line thereof, said brace member being adjustable to vary the position thereof angularly with respect to the mounting member, means to secure the brace member in the angular position to which it is adjusted with respect to said mounting member, and extensible means on said mounting member cooperable between the suspension support and said brace member to urge the latter downwardly into firm engaging contact with the surface of said suspended object.

2. A device for use in conjunction with a suspension support to brace objects suspended therefrom against sway, comprising a structure including a mounting member arranged to be inserted in said support, a sleeve fixedly associated with said member and adapted to extend transversely above the suspended object, a brace member fixedly mounted in said sleeve and having depending spaced parallel leg portions arranged to engage the surface of said suspended object laterally at opposite sides of the center line thereof, and extensible means on said mounting member cooperable between the suspensory support and said sleeve to urge the latter and said brace member downwardly into firm engaging contact with the surface of said suspended object.

3. A device for use in conjunction with a suspension support to brace objects suspended therefrom against sway, comprising a structure including a mounting member arranged to be inserted in said support, a sleeve associated with said member and adapted to extend transversely above the suspended object, a brace member mounted in said sleeve and having depending spaced parallel leg portions arranged to engage the surface of said suspended object laterally at opposite sides of the center line thereof, said brace member being adjustable in said sleeve to adjust the position of said member angularly with respect to the sleeve, means to secure the brace member in the angular position to which it is adjusted with respect to said sleeve, and extensible means on said mounting member cooperable between the suspensory support and said sleeve to urge the latter and said brace member downwardly into firm engaging contact with the surface of said suspended object.

4. A device for use in conjunction with a suspension support to brace objects suspended therefrom against sway, comprising a structure including a mounting member arranged to be inserted in said support, a sleeve associated with said member and adapted to extend transversely above the suspended object, a brace member mounted in said sleeve and having depending spaced parallel leg portions arranged to engage the surface of said suspended object laterally at opposite sides of the center line thereof, said brace member being adjustable in said sleeve to adjust the position of said member angularly with respect to the sleeve, means to secure the brace member in the angular position to which it is adjusted with respect to said sleeve, extensible means on said mounting member cooperable between the suspensory support and said sleeve to urge the latter and said brace member downwardly into firm engaging contact with the surface of said suspended object, and plate elements flexibly connected to said brace member and arranged for interposition between the ends of the legs of the latter and the surface of the said suspended object.

ROBERT M. ELDER.
JOHN J. DOMOJ.

REFERENCES CITED

The following references are of record in the file of this patent:

UNITED STATES PATENTS

| Number | Name | Date |
|---|---|---|
| 2,369,638 | Baker | Feb. 20, 1945 |

FOREIGN PATENTS

| Number | Country | Date |
|---|---|---|
| 490,028 | Great Britain | July 29, 1938 |
| 713,886 | France | Apr. 24, 1931 |